T. POTTINGER.
APPLIANCE FOR DISTRIBUTING GRAIN IN BINS.
APPLICATION FILED MAY 14, 1912.

1,068,006.

Patented July 22, 1913.

2 SHEETS—SHEET 1.

Witnesses
W. B. Johnson
C. Evans

Inventor
Thomas Pottinger

T. POTTINGER.
APPLIANCE FOR DISTRIBUTING GRAIN IN BINS.
APPLICATION FILED MAY 14, 1912.
1,068,006. Patented July 22, 1913.
2 SHEETS—SHEET 2.
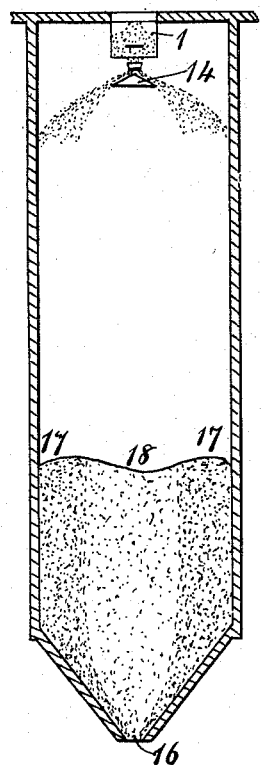
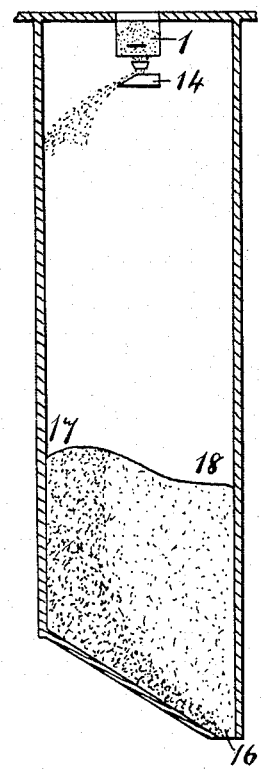
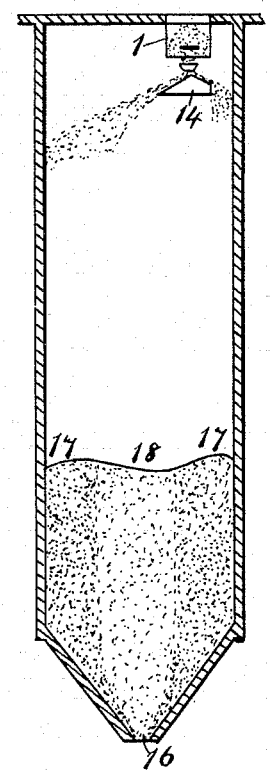
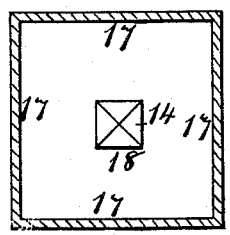
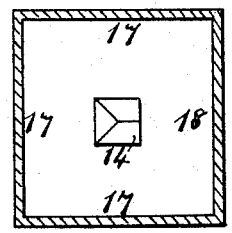
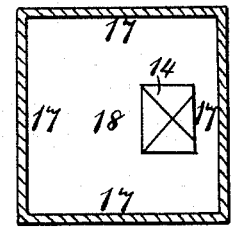
Witnesses
W. B. Johnson
C. Evans
Inventor
Thomas Pottinger

UNITED STATES PATENT OFFICE.

THOMAS POTTINGER, OF EDINBURGH, SCOTLAND, ASSIGNOR TO THOMAS ROBINSON & SON, LIMITED, A JOINT STOCK COMPANY OF GREAT BRITAIN.

APPLIANCE FOR DISTRIBUTING GRAIN IN BINS.

1,068,006.

Specification of Letters Patent.

Patented July 22, 1913.

Application filed May 14, 1912. Serial No. 697,190.

*To all whom it may concern:*

Be it known that I, THOMAS POTTINGER, a subject of the King of Great Britain, residing at Edinburgh, in the county of Edinburgh, Scotland, have invented a new and useful Improvement in Appliances for Distributing Grain in Bins, of which the following is a specification.

This invention relates to appliances for distributing grain in bins so that on discharge a true mixture of grain of various gravities may be obtained.

It is found in practice hitherto that if a number of grades of grain of different specific gravities are stored in a bin, in discharging, the heavier or best quality of grain flows out first from the bottom of the bin, the lighter grain following; but by my method the discharged grain is of equal quality, that is to say, an approximately true or equal mixture of the various grades of grain is obtained. I attain this object by so arranging the feed of grain into the bin that the heavier part of the grain is thrown toward the walls of the bin, the lighter grain falling more in the center, this arrangement being such that when the grain is run out through the bottom of the bin, the heavy grain at the sides of the bin exerting a greater pressure than the lighter grain in the center endeavors to find its way out first but in doing so draws the lighter grain with it thus equalizing the flow through the discharge aperture so that in place of the heavier grain coming away first as hitherto, leaving the lighter grain to come away at the finish, the grain now flows out uniformly mixed. The discharge aperture is commonly in the center of the bin but it may be varied.

It has been proposed to use perforated plates in hoppers, cones, baffle plates, revolving disks, and the like to distribute grain in bins, but so far as can be ascertained and from experiments these do not of themselves attain the desired result.

My invention consists in combining with cones or equivalent directing devices in bins, appliances whereby the flow and rate of fall of the grain from the supply spout on to such cones, &c., may be regulated to attain my object before mentioned.

The invention is hereafter described with reference to the accompanying drawings whereon—

Figure 1:
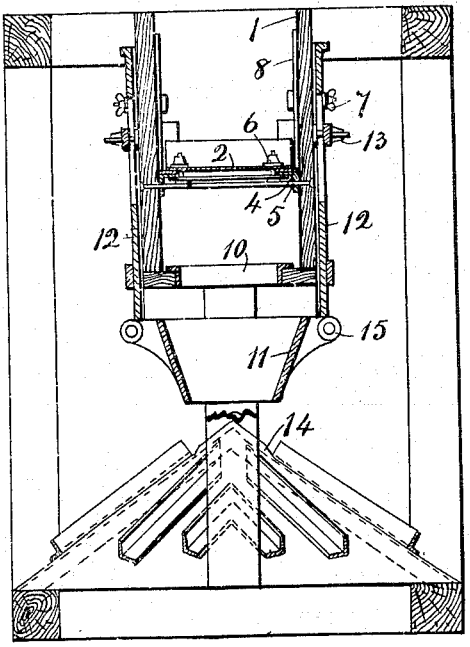
Figure 3:
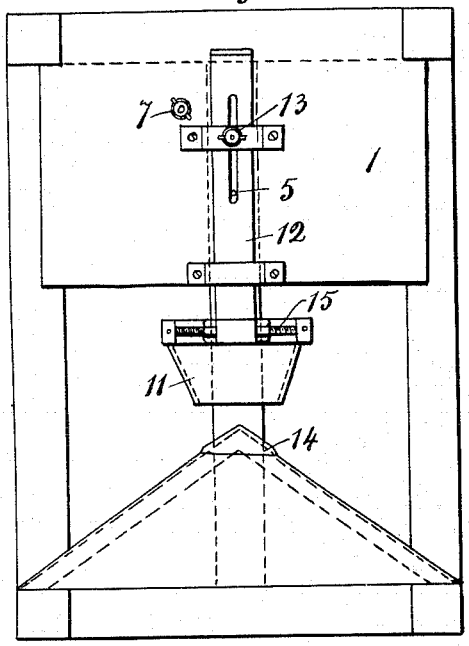
Figure 2:
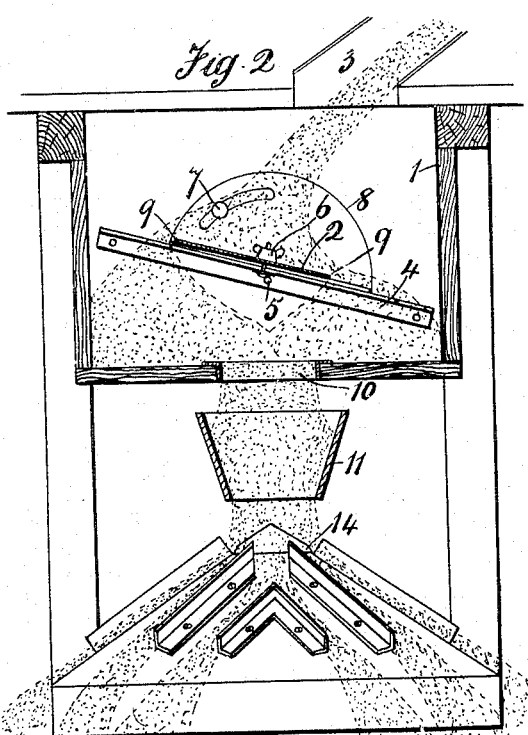
Figure 4:
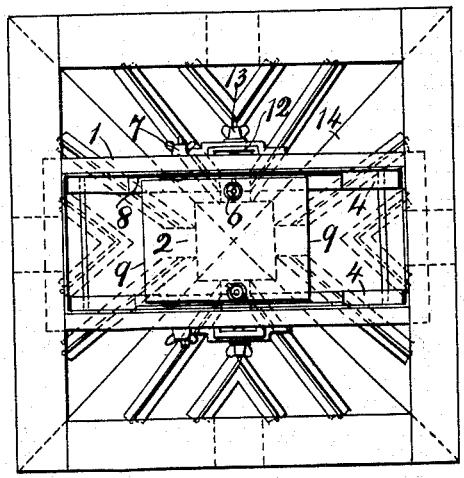

Figures 1 and 2 are sections at right angles to each other. Fig. 3 is a side elevation and Fig. 4 a plan of appliances according to my improvement.

1 is a frame preferably rectangular, supported at the upper part of a bin in any convenient manner, and forming a box in which preferably about the center, is arranged a board or plate 2 on to which the grain from the supply spout 3 falls. The board 2 is adjustable laterally by sliding on a frame 4 pivoted at 5 and is secured in position by clamping nuts and screws 6 or other devices. The board 2 is also adjustable angularly by tilting the slide frame 4 which is secured at the desired angle by clamping nuts and screws 7 engaging with quadrants 8 secured to such frame. By this means the grain is caused to fall equally or unequally as desired over each edge 9 of the board at whatever angle the supply spout 3 is and whether or not the grain is more or less damp or adhesive. After passing the board 2 the grain passes vertically through an opening 10 in the bottom of the box 1 into an open box or hopper 11 below the plate 2 preventing the grain from the spout 3 striking more against one side of the hopper 11 than the other side. The hopper 11 is supported on slides 12 so that such hopper can be set higher or lower, and secured by clamping nuts 13 or other devices, to suit different classes of grain and to regulate the fall of the grain on to the cone 14 below, which cone may be supported in any convenient or well known manner. The hopper 11 is preferably also adjustable laterally by screws and nuts 15 so that the grain can be delivered exactly on the center part of the cone so as to insure proper distribution. The cone 14 may be plane or may have upwardly projecting ribs if desired. By these means I find that the heavier grains are thrown more toward the sides of the bin, and the lighter in proportion to their gravity fall toward the center, the lightest innermost, and when the grain is drawn off through the outlet at the bottom of the bin it is found to be equally mixed for the whole of the discharge instead of being, as hitherto, first the heavy grains and afterward the lighter grains. When the outlet is at different positions in the bottom of the bin or the inlet at different positions in the top of the bin the situation of the cone or equivalent is varied to suit. Figs. 5, 6, 7, 8, 9, and 10 show in diagram different positions and constructions. In Figs. 5 and 6, being a vertical section and plan respectively, the inlet 1 and outlet 16 are central and the cone 14 is a simple pyramid the heavy grains being distributed all around the sides at 17 and the light grains at the center 18. In Figs. 7 and 8 the inlet 1 is central and the outlet 16 at the side. Here the cone 14 is in the form of a house roof with one gable sloped so as to distribute the heavy grains around three sides of the bins while the light collect at one side 18. In Figs. 9 and 10 the inlet is at one side and the outlet at the center, and the pyramidal cone has one side partly cut off to insure equal distribution of the heavy grains around the four sides of the bins. The cones however may be of any suitable form to suit the form of the bins, and secure the desired distribution of the grain.

The outlets 16 are simple openings, and mixing devices thereat which have frequently been proposed, are entirely dispensed with.

I claim—

1. In appliances for distributing grain in bins the combination of a receptacle having an opening at the bottom, a plate adjustable angularly and longitudinally in the receptacle, clamping devices for the plate, a hopper below the opening in the receptacle and adjustable vertically, and distributing devices at the upper part of the bin, substantially as set forth.

2. In appliances for distributing grain in bins the combination of a receptacle having an opening at the bottom, a plate adjustable angularly and longitudinally in the receptacle, clamping devices for the plate, a hopper below the opening in the receptacle and adjustable vertically and laterally, and distributing devices at the upper part of the bin, substantially as set forth.

THOMAS POTTINGER.

Witnesses:
W. B. JOHNSON,
C. EVANS.